Oct. 14, 1947.                L. COOPER ET AL                2,428,908
                                 FISHING REEL
                              Filed Jan. 10, 1946
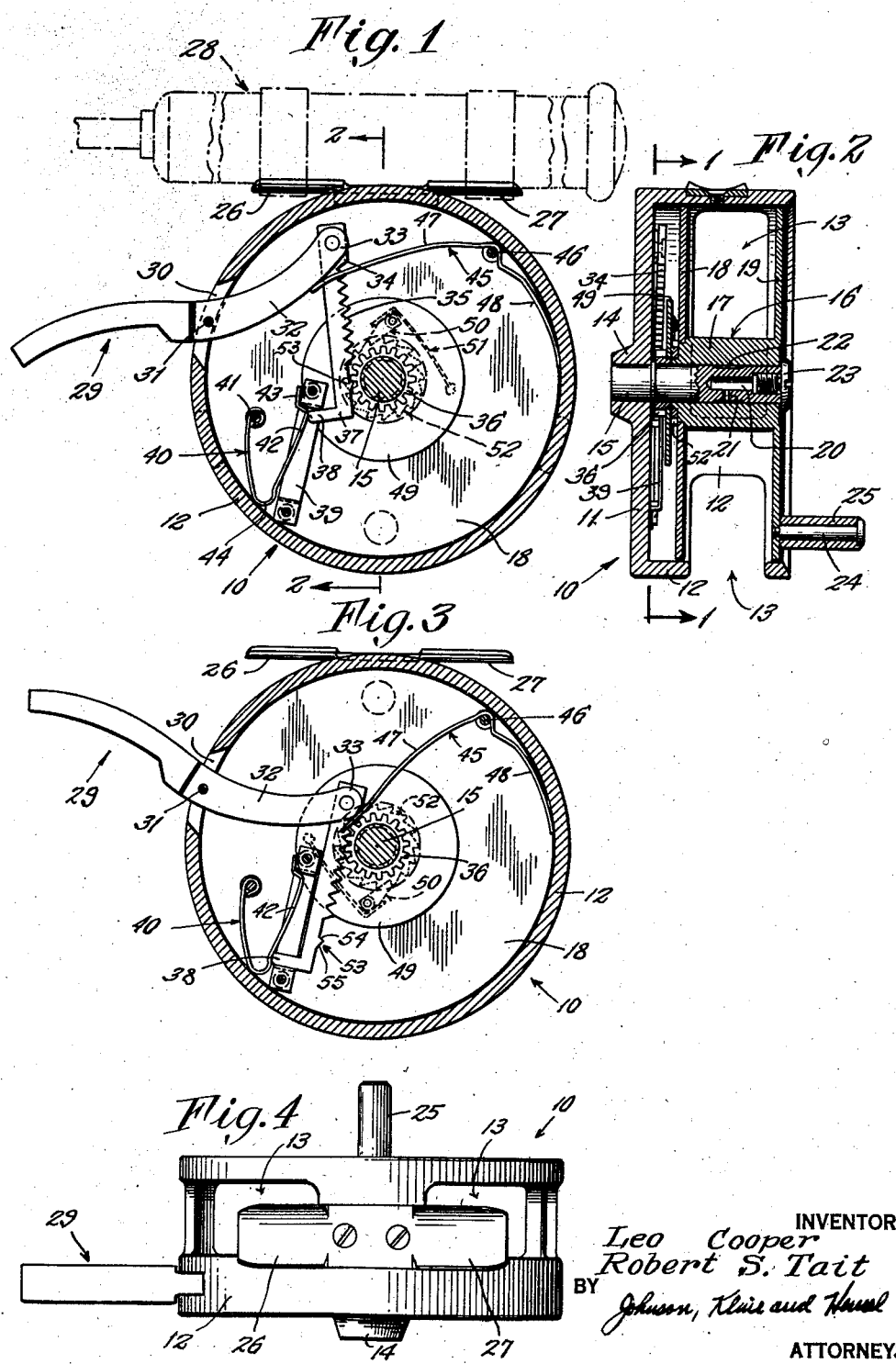
INVENTORS
Leo Cooper
Robert S. Tait
BY
ATTORNEYS Patented Oct. 14, 1947

2,428,908

UNITED STATES PATENT OFFICE 2,428,908

FISHING REEL

Leo Cooper, Stamford, and Robert S. Tait, Stepney Depot, Conn., assignors to P & K Incorporated, a corporation of Illinois Application January 10, 1946, Serial No. 640,184

13 Claims. (Cl. 242—84.6)

This invention relates to fishing reels.

An object of the invention is to provide a fishing reel of the type suitable for mounting on a fishing rod, having means for enabling the reel to be quickly and conveniently operated any desired extent to take up slack in the line, the said operation being accomplished by the fingers of the hand which holds the butt of the fishing rod, and being such as to not require any considerable skill or dexterity on the part of the user, nor to interfere with the manipulation of the rod at any time.

Preferably, and as illustrated in the embodiment of the invention shown herein, the take-up rotation of the reel is accomplished by actuation of a reciprocable member which is located in proximity to the butt of the rod and so disposed that it may be easily depressed by one or several fingers to operate the reel, the said member having means for automatically returning it to starting position when the pressure is removed therefrom. By this arrangement the amount of rotation of the reel is easily controlled, since the manually operable member may be reciprocated only a few times or many times as desired, and such reciprocation may be effected slowly or rapidly at the will of the user, thereby controlling the speed of take up of the line as well as the amount of take up.

In certain types of fishing it is desirable, after casting, to haul in the line by grasping the same preferably immediately ahead of the reel by the free hand, i. e., the hand which is not holding the fishing rod, and by pulling the line through the stays of the rod. This procedure is often done after a fish has been caught on the line, since many anglers prefer this method of pulling in the line due to its enabling them to have a better control of the latter. Such procedure, however, results in considerable slack in the line immediately ahead of the reel, and this slack is often great enough to be carried a substantial distance away from the fishing rod, and to become entangled with twigs, branches, rocks and other objects which might be in the immediate vicinity.

According to our invention, we provide conveniently operable means which responds to pressure of the fingers of the hand carrying the fishing rod, for operating the reel to wind in the line and to take up the slack occasioned by the above method of hauling in the line, the said means being operable without interfering in any manner with manipulation of the fishing rod, and without requiring any great dexterity or skill on the part of the user.

In the specific embodiment of the invention illustrated herein we employ, in connection with the reciprocable driving member for the reel, a ratchet means whereby the reel may continue turning in the direction driven even after cessation of movement of the member, or during the automatic return of the member to starting position. Thus, by giving the reel a substantial impetus upon each driving stroke of the reciprocable member, the reel will continue rotating to take in line during the automatic return of the member preparatory to its next driving stroke. By this arrangement we accomplish a much greater turning of the reel than is produced during the driving strokes alone of the reciprocable member or trigger.

Another object of our invention is to provide a reel-operating line-retrieving means as above outlined which, when in normal inoperative position, functions as a click or detent for the reel.

A further object of the invention is to provide, in a fishing reel of the above character, a click which is instantly adjustable as to the amount of detent action or restraint imposed on the reel.

A still further object of the invention is to provide a reel of the above character wherein the reel-operating means provides a lock, when desired, against rotation of the reel in the direction paying-out the line, the said lock being instantly operative and under the control of the fisherman at any time.

Other features and advantages will hereinafter appear.

In the accompanying drawings:

Figure 1 is a transverse section taken at right angles through the axis of the fishing reel of the invention.

Fig. 2 is a section taken on the line 2—2 of Fig. 1.

Fig. 3 is a view similar to Fig. 1, but showing the trigger of the reel-operating means in depressed position, and Fig. 4 is an elevational view of the reel taken from the mounting side thereof.

Referring to Fig. 2, the reel of the present invention comprises a casing 10 which is in the form of a cylinder having one end open and at the other end an integral wall or closure 11, the side walls 12 of the cylinder being provided with apertures 13. The end wall 11 has a hub 14 in which is rigidly secured a stud 15 extending axially into the casing.

The stud 15 carries a spool or bobbin 16 comprising a hub 17, and side disks 18 and 19 at opposite ends of the hub, the latter being rotatably carried on the fixed stud 15.

Preferably the stud 15 has a central bore 20 communicating by means of a channel 21 with a cylindrically reduced portion 22 for the purpose of providing lubrication for the hub 17, the end of the bore 20 being threaded to receive a screw 23 by means of which the spool 16 is retained on the stud.

The disk 19 of the spool 16 has a stud 24 projecting laterally outward therefrom adjacent its periphery, the said stud rotatably carrying a sleeve 25 functioning as a handle for enabling the spool to be turned in either direction by hand.

Referring to Fig. 1, the casing 10 has blades 26 and 27 extending tangentially therefrom in opposite directions to enable the reel to be secured to the butt 28 of a fishing rod in the usual manner.

According to the present invention novel and conveniently operable means are provided for enabling a user to rotate the spool 16 by the fingers of the hand holding the butt 28 of the fishing rod, for the purpose of taking up slack in the fishing line (not shown) secured to the spool, the said rotation being under such control that the spool may be turned either slowly or rapidly, and to any desired extent or through any number of revolutions, all without interfering with manipulation of the pole.

This means, in the specific embodiment of the invention illustrated herein, comprises a reciprocable member in the form of a trigger 29 extending through a cut 30 in the casing 10, the trigger being pivotally carried by a pin 31 secured to the casing. The trigger 29 has an internal arm 32 which is pivotally connected at its end 33 to one end 34 of a rack having teeth 35 for driving engagement with a pinion 36 rotatably carried on the stud 15.

The free end 37 of the rack 34 has a rightangled extension 38 which projects into a space between the wall 11 and an elongate strap 39 secured to the said wall. Thus, throughout the stroke of the rack 34 the extension 38 will be guided by the strap 39, as may be seen by referring to Figs. 1 and 3.

For the purpose of maintaining the teeth 35 of the rack 34 in engagement with the pinion 36 a substantially U-shaped spring 40 is provided having one end 41 secured to the wall 11, the remote arm 42 of the spring extending generally longitudinally along the inner surface of the strap 39 between the latter and the wall 11, and the end 43 of said arm being offset, as shown, and in engagement with the strap for the purpose of positioning the spring. In this connection it will be noted that the yoke portion 44 of the spring engages the cylindrical wall 12 of the casing 10, thereby providing for a three-point support of the spring 40.

When the trigger 29 is depressed, that is, moved upward from the position of Fig. 1 to the position of Fig. 3, the rack 34 will cause counterclockwise rotation of the pinion 36 on the stud 15. We provide for automatic return of the trigger 29 to the position of Fig. 1 by a spring 45 carried on a pin 46 secured to the wall 11 of the casing, the said spring having arms 47 and 48 bearing respectively against the inner arm 32 of the trigger and the side wall 12 of the casing.

For the purpose of drivingly connecting the spool 16 with the pinion 36, the latter has a circular plate 49 affixed to it, carrying a pawl 50 and a spring 51 for applying pressure to the pawl. The hub 17 of the spool 16 has a ratchet wheel 52 secured to it and adapted to be engaged and driven by the pawl 50 carried on the plate 49. Thus, a one-way driving connection is provided between the pinion 36 and spool 16, and counterclockwise rotation of the pinion, as effected by depressing the trigger 29, results in the pawl 50 driving the ratchet 52 and consequently the spool 16 counterclockwise, as viewed in Figs. 1 and 3.

It will be noted that during the return movement of the trigger 29 to its starting position of Fig. 1, the spool 16 may continue to rotate as a result of the impetus given it during the depressing of the trigger. Even if the trigger 29 should be held in depressed position the spool 16 continues to rotate in the driven direction, as made possible by the one-way drive comprising the pawl and ratchet 52. This is an important aspect of the invention, since it enables a user to rotate the spool 16 through a considerable number of revolutions for taking up slack in the line with the expenditude of very little movement.

For instance, during the depressing movement of the trigger 29 the spool 16 will be driven through approximately one-half a revolution. However, after the trigger has been depressed rapidly, the inertia of the spool will carry it through five or six, or more revolutions, and this may take place either while the trigger is held depressed or while it is being returned by the spring 45 to its starting position. Thus, a considerable amount of line slack may be taken up by giving the trigger 29 only two or three forceful driving movements, corresponding to ten or fifteen, or more revolutions of the spool 16.

Referring to Fig. 1, it will be seen that the trigger 29 extends forwardly from the casing 10 along the butt 28 of the fishing pole and in spaced relation therewith. I have found that by this arrangement the trigger may be conveniently operated either while holding the fishing pole steady or while manipulating the pole as is necessary when a fish has been caught. I prefer to grasp the butt 28 of the pole with one hand immediately ahead of the casing 10, and by use of the fourth and fifth fingers of the hand, the trigger 29 may be conveniently depressed any number of times while still retaining a firm grasp on the butt 28.

According to the present invention when the trigger 29 is moved out of the predetermined extended position shown in Fig. 1, so that any of the teeth 35 of the rack 34 engage the pinion 36, the spool 16 will be locked against retrograde or paying-out rotation, that is, rotation opposite to that effected by the trigger. This is due to the fact that for such retrograde rotation the ratchet wheel 52 must drive the pawl 50, but the latter and plate 49 carrying it cannot move since the pinion 36 is meshed with the rack 34 and the latter is held immovable due to the trigger 29 being held immovable by the fingers. The teeth 35 of the rack 34 when meshed with the teeth of the pinion 36 are securely held in such engagement by the spring 40 which has sufficient strength for this purpose, and therefore any forces tending to rotate the spool 16 and pay-out the fishing line are prevented from doing so since they are insufficient to cause disengagement of the rack and pinion. This is especially true if the trigger 29 is held in the depressed position shown in Fig. 3, wherein the extension 38 of the rack engages the spring 40 adjacent the yoke 44 thereof. For these positions of the parts, it is practically impossible to cause disengagement of the rack and pinion without destruction of the device; similarly, for positions intermediate those shown in Figs. 1 and 3, such disengagement is also practically impossible.

By the provision of the said locking means, operative upon depressing the trigger 29 the fishing line is prevented from being payed-out, and this is extremely useful during the operation of netting a catch.

According to the present invention we provide means acting as a click for the spool 16, in conjunction with the driving mechanism above described for operating the spool to retrieve or take up slack in the fishing line. In accomplishing this, referring to Figs. 1 and 3, we provide a tooth 53 on the rack 34 spaced from the teeth 35 thereof and adapted to engage the pinion 36 when the trigger 29 is in the extended position of Fig. 1. The tooth 53 preferably has a steep slope on one side 54 and a gradual slope on the opposite side 55, the side having the steep slope, in cooperation with the teeth 36 of the pinion, providing the click or detent action. Referring to Fig. 1, if the spool 16 should be rotated in a counterclockwise direction the teeth of the pinion 36 will be forced past the tooth 53, this action being accompanied by a slight lateral separation of the rack 34 from the pinion as made possible by yielding of the rack spring 40. The amount of the slope given to the side 54 of the tooth 53 determines the stiffness or detaining effect of the click, and preferably the proportions are so chosen that just sufficient detent is provided for normal paying-out of the fishing line during casting. Further, according to the invention, the click or detent action on the spool 16 may be increased at the will of the fisherman by the mere process of applying pressure on the trigger 29, this bringing the first of the teeth 35 in engagement with the teeth of the pinion 36, and disengaging the tooth 53 of the rack from the pinion. This engagement of the first tooth 35 provides a slightly stronger detent action, and if the pressure on the trigger 29 is increased the detent action is correspondingly increased so that within certain limits any desired detent or click action may be obtained, to retard paying-out rotation of the spool 16.

Variations and modifications may be made within the scope of this invention and portions of the improvements may be used without others.

We claim:

1. In combination with a fishing reel, a manually operable trigger member movable from and to a predetermined position; and means for driving the reel in line winding direction in response to movement of the member from said predetermined position, said means including a yieldable member constituting an adjustable click drag on the reel when the reel is rotated in unwinding direction and the member is at said predetermined position, said member being arranged to increase the restraint of the click drag upon movement of the member from said predetermined position and in the direction for driving the reel.

2. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; and a pawl and ratchet driving connection between the pinion and the spool whereby movement of the trigger will positively drive the spool in only one direction, the latter being enabled by the said driving connection to spin and continue rotation upon cessation of movement of the trigger at the end of the driving stroke.

3. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; and a one-way driving connection between the pinion and the spool, including a pawl driven by the pinion and ratchet carried by the spool, whereby movement of the trigger will positively drive the spool in only one direction, the latter being enabled by the said driving connection to spin and continue rotation upon cessation of movement of the trigger.

4. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; a pawl and ratchet driving connection between the pinion and the spool whereby movement of the trigger will positively drive the spool in only one direction, the latter being enabled by the said driving connection to spin and continue rotation upon cessation of movement of the trigger; and means associated with the said rack and pinion, providing a click for the spool.

5. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; a pawl and ratchet driving connection between the pinion and the spool whereby movement of the trigger will positively drive the spool in only one direction, the latter being enabled by the said driving connection to continue rotation upon cessation of movement of the trigger; and means associated with the said rack and pinion providing a click for the spool, the said means including a tooth integral with the rack located to engage the pinion when the trigger is in extended or inoperative position.

6. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; a pawl and ratchet driving connection between the pinion and the spool whereby movement of the trigger will positively drive the spool in only one direction, the latter being enabled by the said driving connection to continue rotation upon cessation of movement of the trigger; and means associated with the said rack and pinion providing a click for the spool, the said means including a tooth integral with the rack located to engage the pinion when the trigger is in extended or inoperative position, and including resilient means for yieldably holding the rack and said tooth in said engagement with the pinion.

7. A fishing reel structure comprising a casing; a spool rotatably mounted in the casing; means for securing the casing to a fishing pole; a reciprocable trigger carried by the casing; a pinion coaxial with the spool; a rack connected with the trigger to be operated thereby and arranged to be in engagement with the pinion in all positions of the rack; a pawl and ratchet driving connection between the pinion and the spool whereby movement of the trigger will positively drive the spool in only one direction, the latter being enabled by the said driving connection to continue rotation upon cessation of movement of the trigger; means integral and rigid with said rack and cooperating with the pinion, providing a click for the spool; and separate, manually operable means for rotating the spool in either direction.

8. A fishing reel comprising a casing, a spool rotatably mounted in said casing, and means for driving the spool in line winding direction and enabling the spool to continue turning and spin in said direction after the driving force ceases, including a trigger pivotally mounted on the casing, a pawl plate rotatable about the axis of the spool and disposed in spaced relation to said trigger, pivoted link means pivotally connected to the trigger and connecting said pawl plate to said trigger to drive the same in all positions of the trigger as the trigger is moved about the pivot, a pawl carried by the pawl plate and a ratchet drivingly carried by the spool and cooperating with the pawl to be actuated thereby.

9. A fishing reel comprising a casing, a spool rotatably mounted in said casing, and means for driving the spool in line winding direction and enabling the spool to continue turning in said direction after the driving force ceases, including an actuating arm pivoted intermediate its ends to the casing, a plate movable about the axis of the spool, a trigger on one end of the arm to be engaged by the finger to move the arm, a driving connection between the other end of the arm and the plate in all positions of said arm for moving the plate in response to movement of the trigger, and a pawl and ratchet connection between the plate and spool.

10. A fishing reel comprising a casing; a spool rotatably mounted in said casing; and means for driving the spool in line winding direction and enabling the spool to continue turning in said direction after the driving force ceases, including a trigger pivotally mounted on the casing, a pawl plate rotatable about the axis of the spool and disposed in spaced relation to said trigger, pivoted link means pivotally connected to the trigger and connecting said pawl plate to said trigger in all positions of the trigger to drive the plate, a pawl carried by the pawl plate and a ratchet wheel drivingly connected with the spool and cooperating with the pawl to be actuated thereby.

11. A fishing reel comprising a casing; a spool rotatably mounted in said casing; and means for driving the spool in line winding direction and enabling the spool to continue turning in said direction after the driving force ceases, including a trigger pivotally mounted on the casing, a pawl carrier movable about the axis of the spool and disposed in spaced relation to the trigger, a driving link pivotally connected to the trigger and forming a driving connection between said trigger and pawl carrier in all positions of the trigger for moving the carrier in response to movement of the trigger, a pawl mounted on the pawl carrier for movement therewith, and a ratchet wheel carried by the spool and cooperating with the pawl to be actuated thereby.

12. A fishing reel comprising a casing; a spool rotatably mounted in said casing; and means for driving the spool in line winding direction and enabling the spool to continue turning in said direction after the driving force ceases, including a trigger pivotally mounted on the casing, a pawl carrier movable about the axis of the spool, means including a member pivoted to said trigger and connected to the pawl carrier in all positions of the trigger for moving the carrier in response to pivotal movement of the trigger, a pivoted pawl mounted on the pawl carrier for movement therewith, and a ratchet wheel coaxial with and drivingly connected with the spool and cooperating with the pawl to be actuated thereby.

13. The invention defined in claim 2 wherein said rack and pinion are arranged to hold the reel against unwinding when the trigger is held at the end of the driving stroke.

LEO COOPER.
ROBERT S. TAIT.

REFERENCES CITED

The following references are of record in the file of this patent:

UNITED STATES PATENTS

| Number | Name | Date |
|---|---|---|
| 360,758 | Calder | Apr. 5, 1887 |
| 580,025 | Williams | Apr. 6, 1897 |
| 873,784 | Reichardt | Dec. 17, 1907 |
| 1,906,425 | Scott | Mar. 2, 1933 |

FOREIGN PATENTS

| Number | Country | Date |
|---|---|---|
| 22,420 | Great Britain (1912) | Oct. 2, 1913 |
| 135,667 | Switzerland | Jan. 16, 1930 |